No. 837,567. PATENTED DEC. 4, 1906.
F. C. HOOD.
SECONDARY BATTERY PLATE.
APPLICATION FILED FEB. 20, 1906.
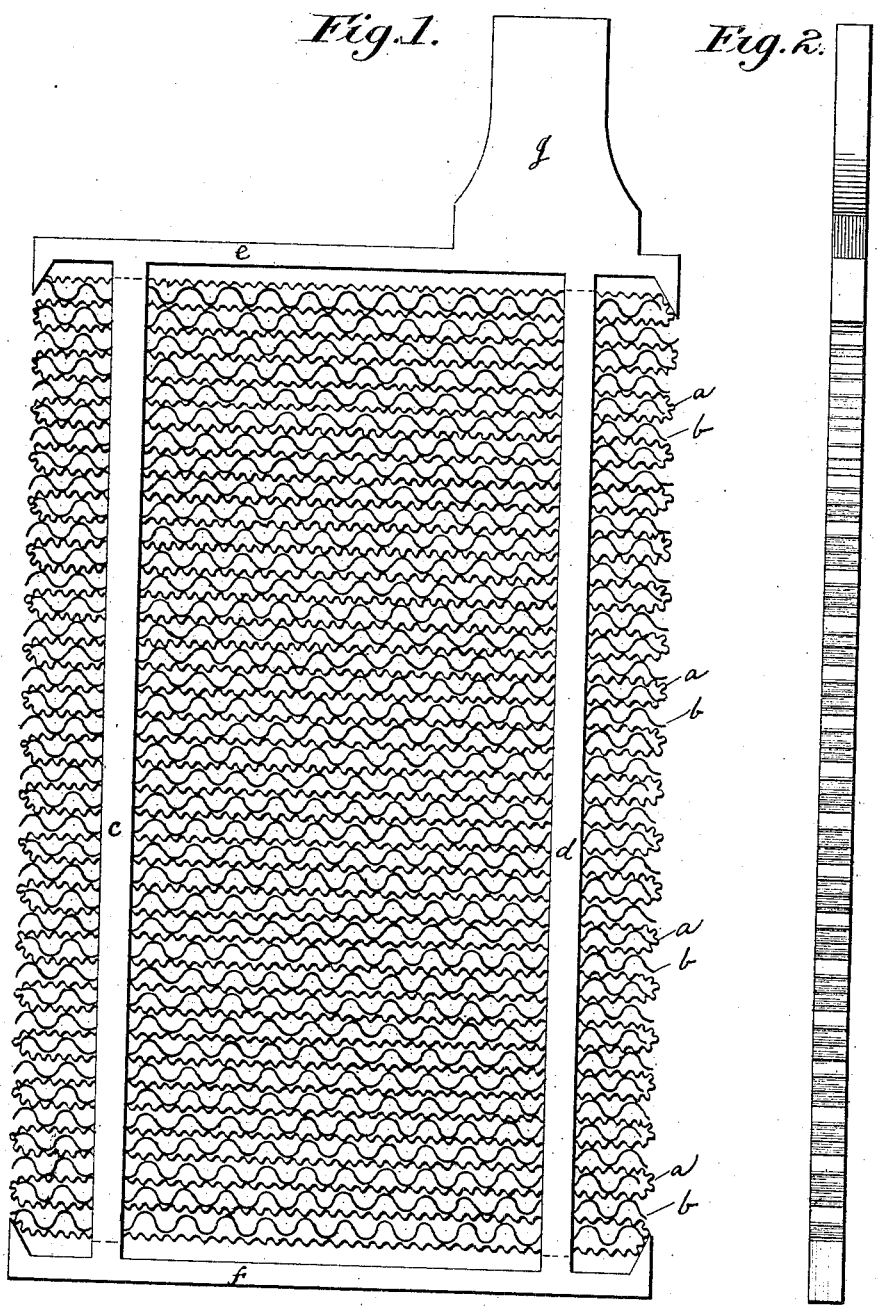

UNITED STATES PATENT OFFICE.

FRANK C. HOOD, OF PHILADELPHIA, PENNSYLVANIA, ASSIGNOR TO JOHN D. ALLEN, OF PHILADELPHIA, PENNSYLVANIA.

SECONDARY-BATTERY PLATE.

No. 837,567.     Specification of Letters Patent.     Patented Dec. 4, 1906.

Application filed February 20, 1906. Serial No. 302,075.

*To all whom it may concern:*

Be it known that I, FRANK C. HOOD, a citizen of the United States, residing at Philadelphia, in the county of Philadelphia and State of Pennsylvania, have invented certain new and useful Improvements in Secondary-Battery Plates, of which the following is a specification.

This invention relates to improvements in the grids or plates of secondary batteries and is designed to obviate the objectionable features which the plates of the class mentioned usually develop in practice.

The object of my invention is to provide a battery-plate which presents an extremely large area of active surface, which is relatively light, and in which no injurious distortion can take place.

The invention will now be described in detail, reference being had to the accompanying drawings, in which—

Figure 1 is a side view of a battery-plate constructed according to my invention. Fig. 2 is an end view of the same.

As shown in said views, my improved plate is composed of a continuous series of superimposed loops of finely-corrugated lead tape $a$, the loops being formed by laying said tape back and forth on a horizontal surface, leaving a relatively wide space between the sides of each loop and separate strips of more deeply corrugated lead tape $b$ interposed between the arms of each loop. When a sufficient number of loops and strips have been thus laid down for the desired area of the plate being constructed, two longitudinal cuts or incisions are made through the tapes from one end of the plate to the other, said cuts or incisions being at equal distances from the sides of the plate or the ends of the loops and strips and at a relatively short distance from said sides. Then bars $c$ and $d$, preferably of antimonious lead, are placed in said cuts or incisions and are burned or soldered to the tapes. To complete the plate, cross-bars $e$ and $f$, also preferably of antimonious lead, are placed at the top and bottom of the plate and are burned or soldered to the longitudinal bars. The top cross-bar $e$ is provided with a lug $g$ for the purpose of affording means whereby the plate can be handled and to which electrical connection can be made.

While I contemplate using the plate as described, it will be readily understood that active material or paste can be held in the corrugations of the tapes.

I am aware that it has heretofore been proposed to construct a battery-plate of alternating straight and corrugated strips of lead inclosed in a frame of lead bars; but the improved plate which constitutes my invention comprises the following advantages over such a structure: First, the continuous corrugated lead strip bent back and forth into parallel loops gives greater stability to the structure and reduces its liability to buckle; second, the plate can be made of any desired size, without regard to the dimensions of the frame, since the longitudinal bars $c$ and $d$, of which there may be more than two if the plate is of large size, are simply cut to correspond to the length of the plate formed by the bent loops and are then burned or soldered into said loops; third, the fact that the bars $c$ and $d$ are inserted at a distance from the ends of the loops gives the plate great freedom to expand without danger of buckling and renders it lighter for a given area of surface than any plate of which I am aware; fourth, the plate can be manufactured more cheaply than a plate constructed of a series of separate strips of lead held in a frame.

Having thus described my invention, what I claim is—

1. A battery-plate comprising a continuous series of parallel loops of finely-corrugated lead tape, separate strips of more deeply corrugated lead tape interposed between the arms of each of said loops, cross-bars at the top and bottom of the plate, and longitudinal bars connecting said cross-bars between the ends and secured to the loops and strips.

2. A battery-plate comprising a continuous series of loops of finely-corrugated lead tape, separate strips of more deeply corrugated lead tape interposed between the arms of each of said loops, two longitudinal bars set into and attached to the said loops and strips intermediate of their ends, and top and bottom bars attached to the ends of said longitudinal bars.

In testimony whereof I have affixed my signature in presence of two witnesses.

FRANK C. HOOD.

Witnesses:
     JOSEPH HUNTER,
     CHAS. LLOYD.